US012216716B2

(12) United States Patent
Hesse et al.

(10) Patent No.: US 12,216,716 B2
(45) Date of Patent: Feb. 4, 2025

(54) CROSS-FUNCTIONAL APPLICATION DATA ATTACHMENT RETRIEVAL

(71) Applicant: SAP SE, Walldorf (DE)

(72) Inventors: Stefan Hesse, Dresden (DE); Matthias Vogel, Saarbrücken (DE)

(73) Assignee: SAP SE, Walldorf (DE)

( * ) Notice: Subject to any disclaimer, the term of this patent is extended or adjusted under 35 U.S.C. 154(b) by 88 days.

(21) Appl. No.: 18/049,063

(22) Filed: Oct. 24, 2022

(65) Prior Publication Data

US 2024/0134917 A1   Apr. 25, 2024
US 2024/0241911 A9   Jul. 18, 2024

(51) Int. Cl.
*G06F 16/93* (2019.01)
*G06F 21/33* (2013.01)

(52) U.S. Cl.
CPC .............. *G06F 16/93* (2019.01); *G06F 21/33* (2013.01)

(58) Field of Classification Search
CPC ....................................................... G06F 16/93
See application file for complete search history.

(56) References Cited

U.S. PATENT DOCUMENTS

| | | | |
|---|---|---|---|
| 7,308,704 B2 | 12/2007 | Vogel et al. | |
| 7,350,237 B2 | 3/2008 | Vogel et al. | |
| 8,874,551 B2 | 10/2014 | Rosjat et al. | |
| 8,918,865 B2 * | 12/2014 | Freericks | H04L 63/14 726/22 |
| 9,569,869 B2 | 2/2017 | Hesse et al. | |
| 9,996,592 B2 | 6/2018 | Hengstler et al. | |
| 10,839,099 B2 | 11/2020 | Vogel et al. | |
| 11,042,654 B2 | 6/2021 | Nos et al. | |
| 2014/0172496 A1 | 6/2014 | Rosjat et al. | |
| 2014/0364983 A1 | 12/2014 | Bildmayer et al. | |
| 2015/0113459 A1 | 4/2015 | Hengstler et al. | |
| 2015/0134808 A1 * | 5/2015 | Fushman | G06Q 30/02 709/224 |
| 2015/0264111 A1 * | 9/2015 | Aleksandrov | H04L 51/08 726/4 |
| 2016/0112438 A1 | 4/2016 | Hengstler et al. | |
| 2022/0050834 A1 | 2/2022 | Rolle et al. | |
| 2022/0277023 A1 | 9/2022 | Rolle et al. | |

OTHER PUBLICATIONS

U.S. Appl. No. 13/589,443, filed Aug. 20, 2012, Hesse et al.

(Continued)

*Primary Examiner* — Grace Park
(74) *Attorney, Agent, or Firm* — Fish & Richardson P.C.

(57) ABSTRACT

In an implementation, a request for one or more attachments stored in an application document store is received from a requestor and by an application agent associated with an application. For each attachment identified in the request, the application agent: 1) requests the attachment from a data privacy integration (DPI) kernel service; 2) receives a download link to an attachment in the application document store; 3) downloads, using the download link, the attachment from the application document store; 4) informs the DPI kernel service that a download of the attachment is complete; and 5) receives a message from the DPI kernel service that the download link has been deactivated. The application agent returns the one or more attachments to the requestor.

20 Claims, 4 Drawing Sheets

(56) References Cited

OTHER PUBLICATIONS

U.S. Appl. No. 17/457,797, filed Dec. 6, 2021, Ighoroje et al.
U.S. Appl. No. 17/457,802, filed Dec. 6, 2021, Rolle et al.
U.S. Appl. No. 17/457,811, filed Dec. 6, 2021, Rolle et al.
U.S. Appl. No. 17/457,816, filed Dec. 6, 2021, Vogel et al.
U.S. Appl. No. 17/457,824, filed Dec. 6, 2021, Vogel et al.
U.S. Appl. No. 17/457,827, filed Dec. 6, 2021, Ighoroje et al.
U.S. Appl. No. 17/680,717, filed Feb. 25, 2022, Rolle et al.
U.S. Appl. No. 17/680,741, filed Feb. 25, 2022, Rolle et al.
U.S. Appl. No. 17/680,759, filed Feb. 25, 2022, Rolle et al.
U.S. Appl. No. 17/702,013, filed Mar. 23, 2022, Rolle et al.
U.S. Appl. No. 17/718,770, filed Apr. 12, 2022, Rolle et al.
Berners-Lee et al., "Uniform Resource Identifier (URI): Generic Syntax", STD 66, RFC 3986, submitted on Jan. 2005, <https://www.rfc-editor.org/info/rfc3986>, 61 pages.
Melnikov et al., "Media Types" submitted on Dec. 9, 2013, <https://www.iana.org/assignments/media-types/media-types.xhtml>, 54 pages.

\* cited by examiner

CROSS-FUNCTIONAL APPLICATION DATA ATTACHMENT RETRIEVAL

BACKGROUND

Computer processing of some particular types of data is important with respect to various processes with one or more software applications. However, various governmental regulations can impose particular legal requirements on the processing of the particular types of data. In heterogeneous computer processing system landscapes, satisfying necessary legal requirements can prove challenging due to pre-existing and differing solution implementations for accessing, processing, and reporting types of data to a requestor.

SUMMARY

The present disclosure describes cross-functional application data attachment retrieval.

In an implementation, a request for one or more attachments stored in an application document store is received from a requestor and by an application agent associated with an application. For each attachment identified in the request, the application agent: 1) requests the attachment from a data privacy integration (DPI) kernel service; 2) receives a download link to an attachment in the application document store; 3) downloads, using the download link, the attachment from the application document store; 4) informs the DPI kernel service that a download of the attachment is complete; and 5) receives a message from the DPI kernel service that the download link has been deactivated. The application agent returns the one or more attachments to the requestor.

The described subject matter can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented to realize one or more of the following advantages.

From a process view: First, source applications (that is, of a responder) can manage document retention with source application policies instead of needing to modify document retention format or procedures. Second, no storage or transfer bandwidth is necessary for transporting documents between a responder source application and a data privacy integration (DPI) kernel service. Third, access to a responder document store is protected from outside access, as a provided download link will only issue for one selected document and for a certain length of time. Fourth, access rights management to a user of the documents can still be applied (for example, by forwarding the identity of the user and evaluating the identity of the user in the system back end, using an authentication token as exchange format for the user information, where user mapping is performed in a system back-end). Fifth, there is no large storage demand for the DPI kernel service or a requesting application. Sixth, in typical implementations, only requested attachments by a data protection specialist will be transferred. In some implementations, a portion of a document can be excluded based on a meta-data or other description (for example, no emails that are stored and based on a direct communication with a data subject are transferred, because the information is health related and must not be revealed to the data subject in order to protect the data subject from self-injury). Seventh, the described concept is simple for future applications to integrate into a computing process system landscape. At a high-level, necessary steps for a new integration of the described concept would be to: 1) respond with the metadata in a data retrieval and to prepare a mechanism to open and close access to an attachment.

From a technical view: First, for a data protection specialist ensuring data security according to governmental or other rules/regulations, handing of an attachment is both secure and transparent. Second, transfer of data to a user is both secure and transparent. A user interacting with a secure agent of an application triggers a report for registered applications. If a request for data is completed, a view of all available attachments in registered applications is provided, and the user can decide to download one or more files. How the one or more files are retrieved in the computing process system landscape and returned to the user is transparent to the user and secure.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

Like reference numbers and designations in the various drawings indicate like elements.

DETAILED DESCRIPTION

Figure 1:
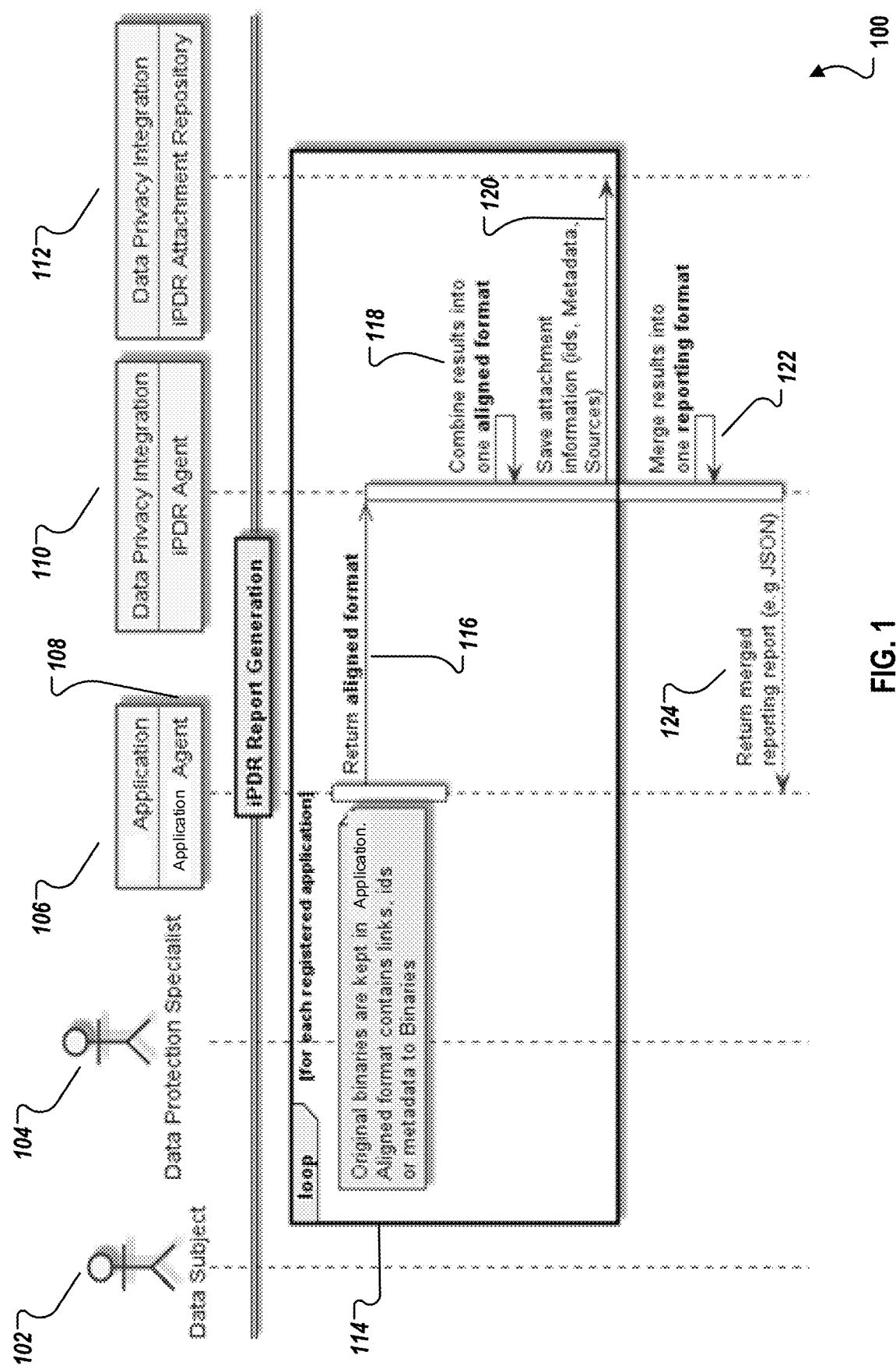
FIG. 1 is a swim diagram illustrating an example of a method for integrated Personal Data Retrieval (iPDR) report generation (attachment resolving preparation), according to an implementation of the present disclosure.

The following detailed description describes cross-functional application data attachment retrieval, and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

Computer processing of some particular types of data (for example, personal data) is important with respect to various processes with one or more software applications. However, various governmental regulations (such as, the European Union General Data Protection Regulation (EU-GDPR)) can impose particular legal requirements on the processing of the particular types of data. As an example, the EU-GDPR requires that a data controller (or data protection specialist) must provide a data subject with information about themselves (that is, personal data or personal identifiable information (PII)) in a structured, commonly used, and machine-readable format. In heterogeneous computer processing system landscapes, satisfying necessary legal requirements can prove challenging due to pre-existing and differing solution implementations for accessing, processing, and reporting types of data to a data controller/data subject. Reporting functions are often not aligned in a manner to provide common: 1) functionality to retrieve personal data (both user interface and user experience); 2) functionality to identify a data subject in each software application; 3) file format; 4) content and file structure, or 5) level-of-detail of the provided information.

The present disclosure describes a method for integrated Personal Data Retrieval (iPDR). The iPDR solution will permit software applications in a heterogeneous computer processing system landscape to securely provide personal data pertaining to an identified data subject in an all-in-one personal data report and in a unified format for efficient data consumption. Computing efficiency improvements can include, among others, a reduced number of user interface steps necessary to obtain requested data, a reduced number of transmitted messages between software applications on a networks, reduced computer processing to obtain the requested data (for example, central processing unit cycles, database access commands, or computer memory storage requirements). Data security is also enhanced as personal data is identified by each application and access to the personal is accomplished through a secure computing environment/methodology. While the methodology is described in terms of personal-type data, other data types are equally applicable with respect to the methodology.

Often each software application handles binary files (for example, PDFs, images, audio/visual files, and documents) in a certain manner and format. At a high-level, the proposed methodology requests special metadata from each software application. The special metadata describes access to an attachment, if the attachment is requested, establishes a connection between a requesting software application and the responding source of the attachment.

In typical implementations, the special metadata contains at least the data identified in Table 1:

TABLE 1

| | |
|---|---|
| Id | An application internal id or similar that distinguishes the attachment from others. |
| Name | A file name. |
| Uniform Resource Identifier (URI) | A resource identifier how to retrieve the document. For example, a URI consistent with RFC 3986 including: 1) scheme (e.g., schema or protocol); 2) authority (e.g, source or server); 3) path; 4) query; and 5) fragment. |
| Configuration | Additional information necessary to access the attachment (for example, ODATA). |
| Media type | A two-part identifier for file format (for example, application/pdf, image/jpeg, text/csv, or other Internet Assigned Numbers Authority (IANA) Media Types). |

In other implementations, other data can be included, substituted, or determined in a manner consistent with this disclosure and the principles described herein. In some implementations, metadata pointing to unstructured data must include a flag if unstructured data contains special categories (for example, sensitive personal data).

FIG. 1 is a swim diagram illustrating an example of a method 100 for integrated Personal Data Retrieval (iPDR) report generation (attachment resolving preparation), according to an implementation of the present disclosure. The iPDR report includes, among other things, information about attachments related to requested A Data Privacy Integration (DPI) kernel service orchestrates and forwards requests as work item/task to registered applications. In typical implementations, registered application instances would have a unique identifier maintained by DPI kernel service. The result of each single application is aligned into one result, and then results are processed in a merge activity into a single iPDR report.

As shown in FIG. 1, the described methodology includes a Data Subject 102, Data Protection Specialist (or data controller) 104, Application 106, Application Agent 108, DPI iPDR Agent 110, and DPI iPDR Attachment Repository 112. In the present description, the DPI iPDR Agent 110 and DPI iPDR Attachment Repository 112 are associated with the DPI kernel service.

At 114, a Data Protection Specialist 104 using an Application 106 (requestor) requests an iPDR report for personal data associated with Data Subject 102 from each registered Application 106. In some implementations, the Application 106 has a dedicated Application Agent 108. Application Agent 108 redirects the request to the DPI kernel service (here, using the DPI iDPR Agent 110). A loop then executes for all registered Applications 106. Original binaries (data) related to Data Subject 102 are stored by the Application 106. From 114, method 100 proceeds to 116.

At 116, the DPI iDPR Agent 110 requests attachment data for the personal data associated with Data Subject 102 in an aligned format from the Application Agent 108 associated with each registered Application 106. The Application Agent 108 generates and returns the attachment data (for example, containing links, IDs, or metadata to binaries) in an aligned format identifying the personal data related to Data Subject 102. From 116, method 100 proceeds to 118.

At 118, the DPI iPDR Agent 110 combines the returned attachment data from 116 into one aligned format. From 118, method 100 proceeds to 120.

At 120, the DPI iPDR Agent 110 saves attachment information (for example, IDs, metadata, or sources) into the DPI iPDR Attachment Repository 112.

Once attachment information associated with the last registered Application 106 is stored into the DPI iPDR Attachment Repository 112, loop 114 of method 100 ends and processing proceeds to 122.

At 122, the DPI iPDR Agent 110 merges all results from loop 114 combined into one aligned format into one reporting format. In typical implementations, the merging by the DPI iPDR Agent 110 includes removing duplicate information. From 122, method 100 proceeds to 124.

At 124, the DPI iPDR Agent 110 returns a merged iPDR report to the Application Agent 108 of the requesting Application 106 (the requestor). Note that there can be one requestor (for example, Application Agent 108) and multiple responders (for example, Application 106) returning results to the DPI kernel service. In some implementations, the returned merged iPDR report can be in Javascript Object Notation (JSON) or other format. The Application Agent 108 returns the iPDR report to the Data Protection Specialist 104 (not illustrated).

The Data Protection Specialist 104 then reviews the iPDR report (not illustrated).

The Data Protection Specialist 104 selects one or more attachments from the iPDR report (not illustrated). Processing then moves to downloading the one or more attachments as described in FIG. 2 and associated description.

Figure 2:
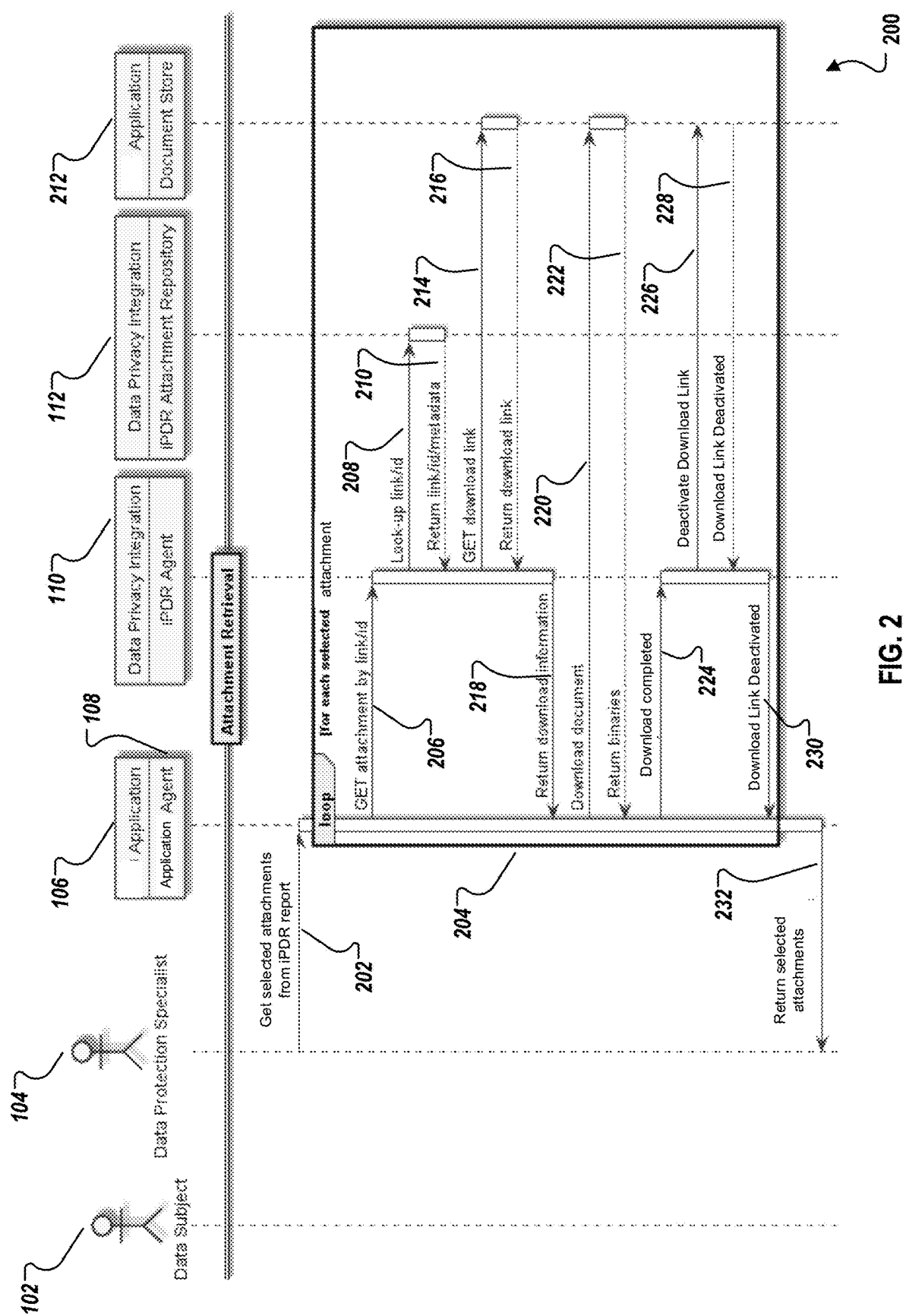
FIG. 2 is a swim diagram illustrating an example of a method for attachment retrieval, according to an implementation of the present disclosure.

FIG. 2 is a swim diagram illustrating an example of a method 200 for attachment retrieval, according to an implementation of the present disclosure.

As described in FIG. 1, after receiving the attachment data in aligned format from all Application Agents 108 of the registered Applications 106, the DPI stores the DPI iPDR Agent 110 saves attachment information (for example, IDs, metadata, or sources) into the DPI iPDR Attachment Repository 112.

At 202, a request by the Data Protection Specialist 104 for one or more attachments from the iPDR report is sent to one or more Applications 106/Application Agents 108 that are associated with the attachments. Note that Application 106 can maintain attachments according to their own storage and security policies. The described flow assumes that there are two or more attachments to retrieve. From 202, method 200 proceeds to 204.

At 204, a loop is entered to retrieve the two or more attachments selected by the Data Protection Specialist 104. Processing moves to 206.

At 206, the Application Agent 108 requests an attachment from the DPI kernel service using the DPI iPDR Agent 110 by a link or ID to the attachment in the request found by the Data Protection Specialist 104 in the returned iPDR report described in FIG. 1. From 206, method 200 proceeds to 208.

At 208, the DPI iPDR Agent 110 requests a download source of the attachment from the DPI iPDR Attachment Repository 112 by looking up the link or ID referring to the attachment. From 208, method 200 proceeds to 210.

At 210, DPI iPDR Attachment Repository 112 determines the source of the attachment in the Application Document Store 212 and returns a link, ID, or metadata associated with the attachment describing the source of the attachment in the Application Document Store 212. From 210, method 200 proceeds to 214.

At 214, the DPI iPDR Agent 110 requests a download link (for example, a URL or SFTP access) to the attachment from the Application Document Store 212. Note that the request allows protection of the attachment until this download request is issued. In some implementations, the download link on might include necessary credentials, tokens, or certificates for access/authentication. In some implementations the Application Document Store 212 could also prepare an attachment for download (for example, converting into a certain file format or size). In some implementations, an attachment could also be copied into a separate storage location where the Application 106 can share the requested download link. From 214, method 200 proceeds to 216.

At 216, the Application Document Store 212 returns a download link for the attachment to the DPI iPDR Agent 110. From 216, method 200 proceeds to 218.

At 218, the DPI iPDR Agent 110 returns the download link to the Application Agent 108. Note that by transmitting the download link, it is not necessary for network bandwidth to be used by the DPI kernel service to transfer attachments. From 218, method 200 proceeds to 220.

At 220, the Application Agent 108 requests a download of the attachment from the Application Document Store 212 using the download link. In some implementations, certificates/tokens or information about the Data Protection Specialist 104 can be included in the download request to mitigate the need for additional logins or security checks. From 220, method 200 proceeds to 222.

At 222, the Application Document Store 212 returns the attachment binaries to the Application Agent 108 for relay to the Application 106. In some implementations, the Application Document Store 212 can return the attachment binaries directly to the Application. From 222, method 200 proceeds to 224.

At 224, the Application Agent 108 informs the DPI iPDR Agent 110 that the download of the attachment binaries to the Application 106 is complete. From 224, method 200 proceeds to 226.

At 226, the DPI iPDR Agent 110 requests that the Application Document Store 212 deactivate the download link. This is a security feature to ensure that the downloaded attachment cannot be subsequently downloaded using the download link outside of the initial request by the Application Agent 108. The download link and any associated security credentials are invalidated. In some implementations, the attachment can also be physically removed from the previously mentioned separate storage location (if used for download). From 226, method 200 proceeds to 228.

At 228, the Application Document Store 212 deactivates the download link and reports the deactivation of the download link to the DPI iPDR Agent 110. From 228, method 200 proceeds to 230.

At 230, the DPI iPDR Agent 110 reports to the Application Agent 108 that the download link has been deactivated. From 230, method 200 proceeds to 232.

At 232, the Application Agent 108 returns the selected attachments to the Data protection Specialist 104.

Figure 3:
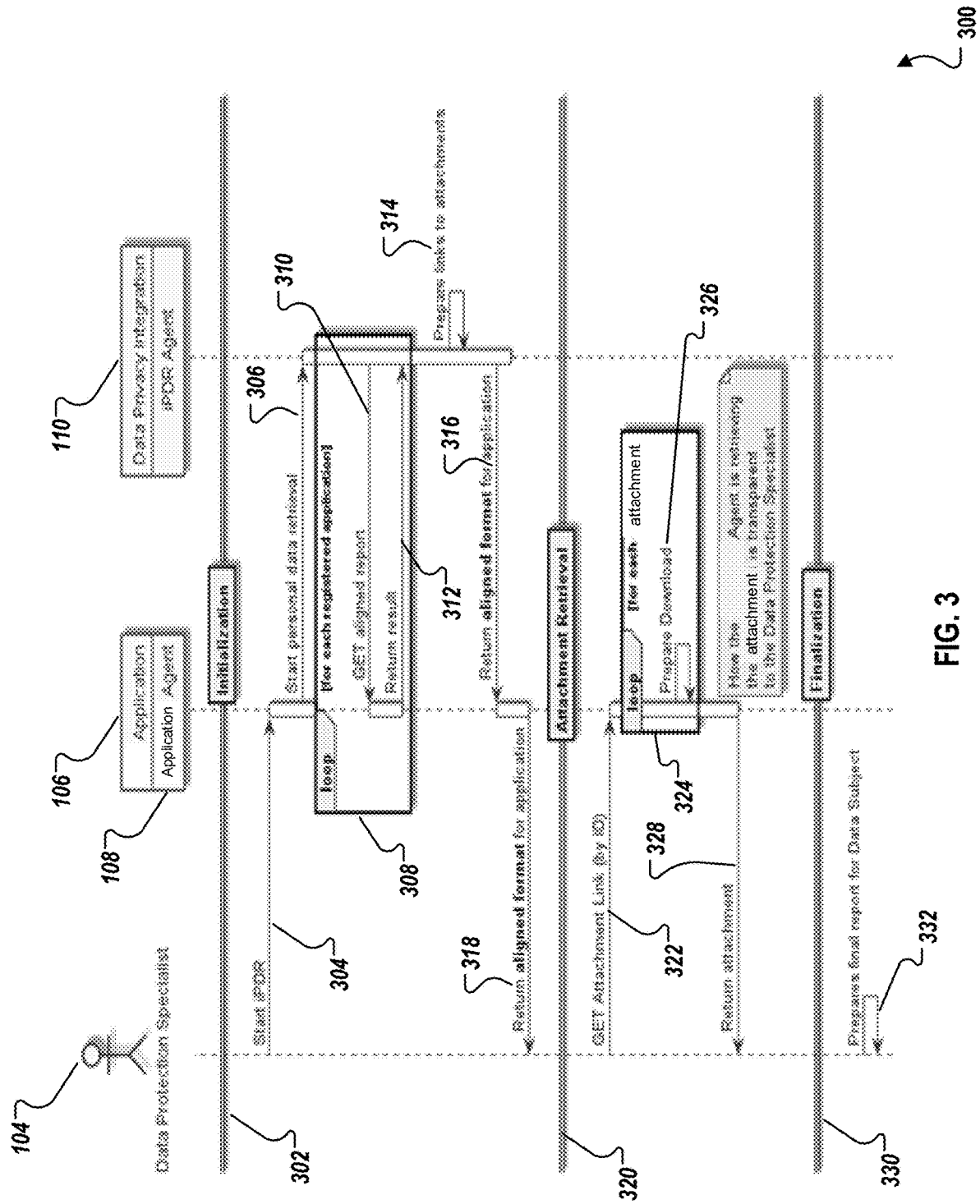
FIG. 3 is a swim diagram illustrating an example of a method for attachment handling, according to an implementation of the present disclosure.

FIG. 3 is a swim diagram illustrating an example of a method 300 for attachment handling, according to an implementation of the present disclosure.

From a Data Protection Specialist 104 perspective, attachment handling is transparent. The Data Protection Specialist 104 interacts with an Application Agent 108 of an Application 106 and triggers an iPDR report for registered Applications 106. If the request is completed, the Data Protection Specialist receives a view of all available attachments in the registered Applications 106 and decides to download one or more attachments.

302 indicates an initialization phase of attachment handling:

At 304, the Data Protection Specialist 104 requests generation of an iPDR report for a Data Subject (not illustrated, but consistent with Data Subject 102 in FIGS. 1 and 2) from the Application Agent 108. From 304, method 300 proceeds to 306.

At 306, the Application Agent 308 requests personal data retrieval from the DPI iPDR Agent 110. From 306, method 300 proceeds to 308.

At 308, a loop is initiated for each registered Application 106. From 308, method 300 proceeds to 310.

At 310, the DPI iPDR Agent 110 requests attachment data for the personal data associated with the Data Subject in an aligned format from the Application Agent 108 associated with each registered Application 106. From 310, method 300 proceeds to 312.

At 312, the Application Agent 108 generates and returns the attachment data (for example, containing links, IDs, or metadata to binaries) in an aligned format identifying the personal data related to the Data Subject. Following looping through each registered Application 106 in loop 308, method 300 proceeds to 314.

At 314, the DPI iPDR Agent 110 prepares links to attachments applicable to the Data Subject in a manner consistent with the description in FIG. 1. From 314, method 300 proceeds to 316.

At 316, DPI iPDR Agent 110 returns a merged iPDR report to the Application Agent 108 of the requesting Application 106 (the requestor). In some implementations, the returned merged iPDR report can be in Javascript Object Notation (JSON) or other format. From 316, method 300 proceed to 318.

At 318, the Application Agent 108 returns the iPDR report to the Data Protection Specialist 104.

320 indicates an attachment retrieval phase of attachment handling:

At 322, a request by the Data Protection Specialist 104 for one or more attachments from the iPDR report is sent to one or more Applications 106/Application Agents 108 associated with the attachments. Note that Application 106 can maintain attachments according to their own storage and security policies. From 322, method 300 proceeds to 324.

At 324, a loop is entered to retrieve the one or more attachments selected by the Data Protection Specialist 104. Processing moves to 326.

At 326, the Application Agent 108 prepares downloads of the requested one or more attachments consistent with the description in FIG. 2. Following processing of each requested attachment in loop 324, method 300 proceeds to 328.

At 328, the Application Agent 108 returns the requested one or more attachments to the Data Protection Specialist 104.

330 indicates finalization phase of attachment handling:

At 332, the Data Protection Specialist prepares a final report for the Data Subject.

Figure 4:
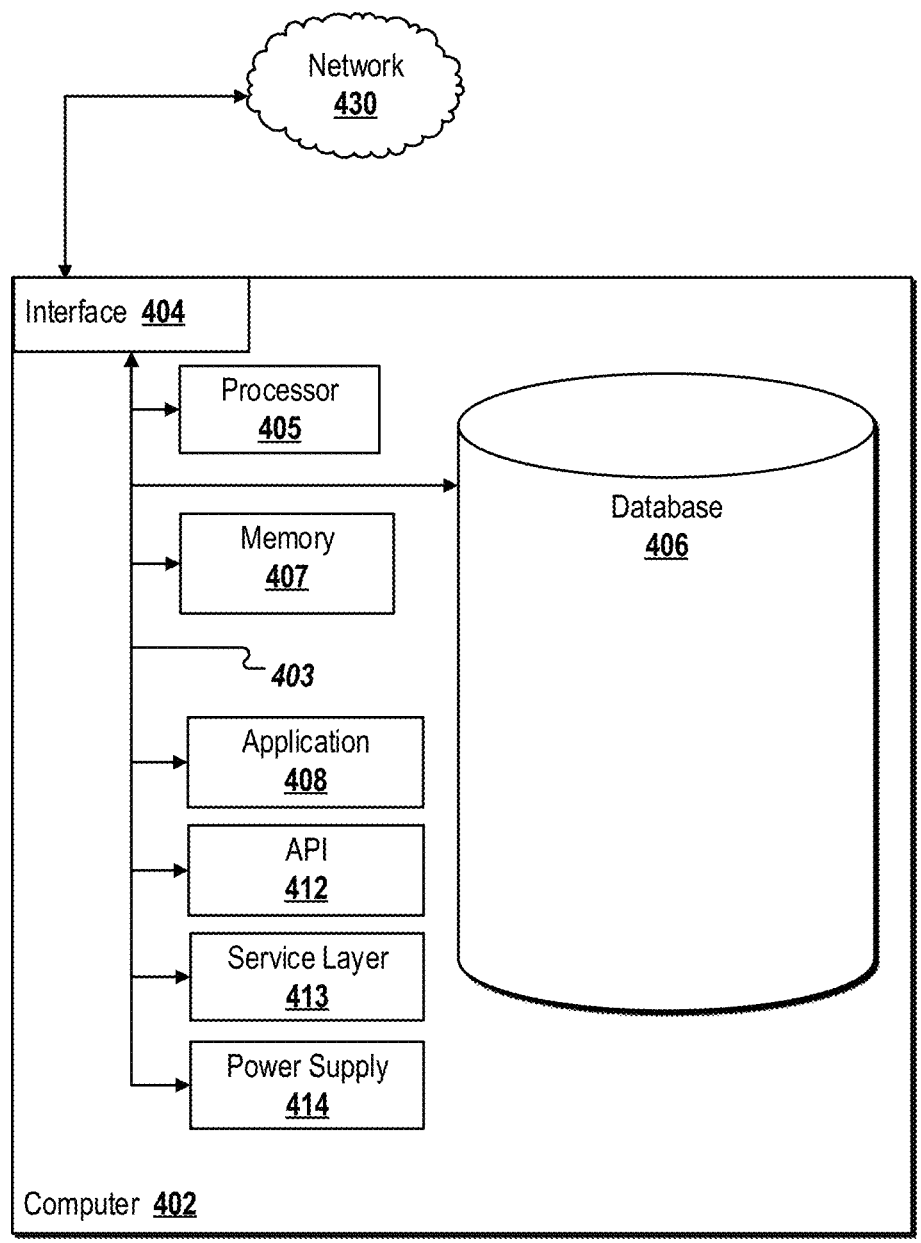
FIG. 4 is a block diagram illustrating an example of a computer-implemented system used to provide computational functionalities associated with described algorithms, methods, functions, processes, flows, and procedures, according to an implementation of the present disclosure.

FIG. 4 is a block diagram illustrating an example of a computer-implemented System 400 used to provide computational functionalities associated with described algorithms, methods, functions, processes, flows, and procedures, according to an implementation of the present disclosure. In the illustrated implementation, System 400 includes a Computer 402 and a Network 430.

The illustrated Computer 402 is intended to encompass any computing device, such as a server, desktop computer, laptop/notebook computer, wireless data port, smart phone, personal data assistant (PDA), tablet computer, one or more processors within these devices, or a combination of computing devices, including physical or virtual instances of the computing device, or a combination of physical or virtual instances of the computing device. Additionally, the Computer 402 can include an input device, such as a keypad, keyboard, or touch screen, or a combination of input devices that can accept user information, and an output device that conveys information associated with the operation of the Computer 402, including digital data, visual, audio, another type of information, or a combination of types of information, on a graphical-type user interface (UI) (or GUI) or other UI.

The Computer 402 can serve in a role in a distributed computing system as, for example, a client, network component, a server, or a database or another persistency, or a combination of roles for performing the subject matter described in the present disclosure. The illustrated Computer 402 is communicably coupled with a Network 430. In some implementations, one or more components of the Computer 402 can be configured to operate within an environment, or a combination of environments, including cloud-computing, local, or global.

At a high level, the Computer 402 is an electronic computing device operable to receive, transmit, process, store, or manage data and information associated with the described subject matter. According to some implementations, the Computer 402 can also include or be communicably coupled with a server, such as an application server, e-mail server, web server, caching server, or streaming data server, or a combination of servers.

The Computer 402 can receive requests over Network 430 (for example, from a client software application executing on another Computer 402) and respond to the received requests by processing the received requests using a software application or a combination of software applications. In addition, requests can also be sent to the Computer 402 from internal users (for example, from a command console or by another internal access method), external or third-parties, or other entities, individuals, systems, or computers.

Each of the components of the Computer 402 can communicate using a System Bus 403. In some implementations, any or all of the components of the Computer 402, including hardware, software, or a combination of hardware and software, can interface over the System Bus 403 using an application programming interface (API) 412, a Service Layer 413, or a combination of the API 412 and Service Layer 413. The API 412 can include specifications for routines, data structures, and object classes. The API 412 can be either computer-language independent or dependent and refer to a complete interface, a single function, or even a set of APIs. The Service Layer 413 provides software services to the Computer 402 or other components (whether illustrated or not) that are communicably coupled to the Computer 402. The functionality of the Computer 402 can be accessible for all service consumers using the Service Layer 413. Software services, such as those provided by the Service Layer 413, provide reusable, defined functionalities through a defined interface. For example, the interface can be software written in a computing language (for example JAVA or C++) or a combination of computing languages, and providing data in a particular format (for example, extensible markup language (XML)) or a combination of formats. While illustrated as an integrated component of the Computer 402, alternative implementations can illustrate the API 412 or the Service Layer 413 as stand-alone components in relation to other components of the Computer 402 or other components (whether illustrated or not) that are communicably coupled to the Computer 402. Moreover, any or all parts of the API 412 or the Service Layer 413 can be implemented as a child or a sub-module of another software module, enterprise application, or hardware module without departing from the scope of the present disclosure.

The Computer 402 includes an Interface 404. Although illustrated as a single Interface 404, two or more Interfaces 404 can be used according to particular needs, desires, or particular implementations of the Computer 402. The Interface 404 is used by the Computer 402 for communicating with another computing system (whether illustrated or not) that is communicatively linked to the Network 430 in a distributed environment. Generally, the Interface 404 is operable to communicate with the Network 430 and includes logic encoded in software, hardware, or a combination of software and hardware. More specifically, the Interface 404 can include software supporting one or more communication protocols associated with communications such that the Network 430 or hardware of Interface 404 is operable to communicate physical signals within and outside of the illustrated Computer 402.

The Computer 402 includes a Processor 405. Although illustrated as a single Processor 405, two or more Processors 405 can be used according to particular needs, desires, or particular implementations of the Computer 402. Generally, the Processor 405 executes instructions and manipulates data to perform the operations of the Computer 402 and any algorithms, methods, functions, processes, flows, and procedures as described in the present disclosure.

The Computer 402 also includes a Database 406 that can hold data for the Computer 402, another component communicatively linked to the Network 430 (whether illustrated or not), or a combination of the Computer 402 and another component. For example, Database 406 can be an in-memory or conventional database storing data consistent with the present disclosure. In some implementations, Database 406 can be a combination of two or more different database types (for example, a hybrid in-memory and conventional database) according to particular needs, desires, or particular implementations of the Computer 402 and the described functionality. Although illustrated as a single Database 406, two or more databases of similar or differing types can be used according to particular needs, desires, or particular implementations of the Computer 402 and the described functionality. While Database 406 is illustrated as an integral component of the Computer 402, in alternative implementations, Database 406 can be external to the Computer 402. In some implementations, the Database 406 can hold previously described attachments or certificates/tokens. The Database 406 can also hold other data types consistent with the disclosure.

The Computer 402 also includes a Memory 407 that can hold data for the Computer 402, another component or components communicatively linked to the Network 430 (whether illustrated or not), or a combination of the Computer 402 and another component. Memory 407 can store any data consistent with the present disclosure. In some implementations, Memory 407 can be a combination of two or more different types of memory (for example, a combination of semiconductor and magnetic storage) according to particular needs, desires, or particular implementations of the Computer 402 and the described functionality. Although illustrated as a single Memory 407, two or more Memories 407 or similar or differing types can be used according to particular needs, desires, or particular implementations of the Computer 402 and the described functionality. While Memory 407 is illustrated as an integral component of the Computer 402, in alternative implementations, Memory 407 can be external to the Computer 402.

The Application 408 is an algorithmic software engine providing functionality according to particular needs, desires, or particular implementations of the Computer 402, particularly with respect to functionality described in the present disclosure. For example, Application 408 can serve as one or more components, modules, or applications. Further, although illustrated as a single Application 408, the Application 408 can be implemented as multiple Applications 408 on the Computer 402. In addition, although illustrated as integral to the Computer 402, in alternative implementations, the Application 408 can be external to the Computer 402.

The Computer 402 can also include a Power Supply 414. The Power Supply 414 can include a rechargeable or non-rechargeable battery that can be configured to be either user- or non-user-replaceable. In some implementations, the Power Supply 414 can include power-conversion or management circuits (including recharging, standby, or another power management functionality). In some implementations, the Power Supply 414 can include a power plug to allow the Computer 402 to be plugged into a wall socket or another power source to, for example, power the Computer 402 or recharge a rechargeable battery.

There can be any number of Computers 402 associated with, or external to, a computer system containing Computer 402, each Computer 402 communicating over Network 430. Further, the term "client," "user," or other appropriate terminology can be used interchangeably, as appropriate, without departing from the scope of the present disclosure. Moreover, the present disclosure contemplates that many users can use one Computer 402, or that one user can use multiple computers 402.

Described implementations of the subject matter can include one or more features, alone or in combination.

For example, in a first implementation, a computer-implemented method, comprises: receiving, from a requestor and by an application agent associated with an application, a request for one or more attachments stored in an application document store; for each attachment identified in the request, the application agent: requests the attachment from a data privacy integration (DPI) kernel service; receives a download link to an attachment in the application document store; downloads, using the download link, the attachment from the application document store; informs the DPI kernel service that a download of the attachment is complete; and receives a message from the DPI kernel service that the download link has been deactivated; and returning, by the application agent the one or more attachments to the requestor.

The foregoing and other described implementations can each, optionally, include one or more of the following features:

A first feature, combinable with any of the following features, wherein the download link includes credentials, tokens, or certificates for authentication.

A second feature, combinable with any of the previous or following features, comprising: requesting, by a DPI integrated personal data retrieval (iPDR) agent and to a DPI iPDR attachment repository, metadata describing a download source of the attachment in the application document store; and receiving, by the DPI iPDR agent, the metadata.

A third feature, combinable with any of the previous or following features, comprising: determining, in the DPI iPDR attachment repository, the download source of the attachment in the application document store; and generating the metadata describing the download source of the attachment in the application document store.

A fourth feature, combinable with any of the previous or following features, comprising: requesting, by the DPI iPDR agent and to the application document store, the download link; and receiving, by the DPI iPDR agent, and from the application document store the download link.

A fifth feature, combinable with any of the previous or following features, comprising: requesting, by the DPI iPDR agent and to the application document store, deactivation of the download link; and receiving, by the DPI iPDR agent, and from the application document store, an indication that the download link has been deactivated.

A sixth feature, combinable with any of the previous or following features, comprising: deactivating, by the application document store, the download link; and generating, by the application document store, the indication that the download link has been deactivated.

In a second implementation, a non-transitory, computer-readable medium storing one or more instructions executable by a computer system to perform operations comprising: receiving, from a requestor and by an application agent associated with an application, a request for one or more attachments stored in an application document store; for each attachment identified in the request, the application agent: requests the attachment from a data privacy integration (DPI) kernel service; receives a download link to an attachment in the application document store; downloads, using the download link, the attachment from the application document store; informs the DPI kernel service that a download of the attachment is complete; and receives a message from the DPI kernel service that the download link has been deactivated; and returning, by the application agent the one or more attachments to the requestor.

The foregoing and other described implementations can each, optionally, include one or more of the following features:

A first feature, combinable with any of the following features, wherein the download link includes credentials, tokens, or certificates for authentication.

A second feature, combinable with any of the previous or following features, comprising: requesting, by a DPI integrated personal data retrieval (iPDR) agent and to a DPI iPDR attachment repository, metadata describing a download source of the attachment in the application document store; and receiving, by the DPI iPDR agent, the metadata.

A third feature, combinable with any of the previous or following features, comprising: determining, in the DPI iPDR attachment repository, the download source of the attachment in the application document store; and generating the metadata describing the download source of the attachment in the application document store.

A fourth feature, combinable with any of the previous or following features, comprising: requesting, by the DPI iPDR agent and to the application document store, the download link; and receiving, by the DPI iPDR agent, and from the application document store the download link.

A fifth feature, combinable with any of the previous or following features, comprising: requesting, by the DPI iPDR agent and to the application document store, deactivation of the download link; and receiving, by the DPI iPDR agent, and from the application document store, an indication that the download link has been deactivated.

A sixth feature, combinable with any of the previous or following features, comprising: deactivating, by the application document store, the download link; and generating, by the application document store, the indication that the download link has been deactivated.

In a third implementation, a computer-implemented system, comprises: receiving, from a requestor and by an application agent associated with an application, a request for one or more attachments stored in an application document store; for each attachment identified in the request, the application agent: requests the attachment from a data privacy integration (DPI) kernel service; receives a download link to an attachment in the application document store; downloads, using the download link, the attachment from the application document store; informs the DPI kernel service that a download of the attachment is complete; and receives a message from the DPI kernel service that the download link has been deactivated; and returning, by the application agent the one or more attachments to the requestor.

The foregoing and other described implementations can each, optionally, include one or more of the following features:

A first feature, combinable with any of the following features, wherein the download link includes credentials, tokens, or certificates for authentication.

A second feature, combinable with any of the previous or following features, comprising: requesting, by a DPI integrated personal data retrieval (iPDR) agent and to a DPI iPDR attachment repository, metadata describing a download source of the attachment in the application document store; and receiving, by the DPI iPDR agent, the metadata.

A third feature, combinable with any of the previous or following features, comprising: determining, in the DPI iPDR attachment repository, the download source of the attachment in the application document store; and generating the metadata describing the download source of the attachment in the application document store.

A fourth feature, combinable with any of the previous or following features, comprising: requesting, by the DPI iPDR agent and to the application document store, the download link; and receiving, by the DPI iPDR agent, and from the application document store the download link.

A fifth feature, combinable with any of the previous or following features, comprising: requesting, by the DPI iPDR agent and to the application document store, deactivation of the download link; and receiving, by the DPI iPDR agent, and from the application document store, an indication that the download link has been deactivated.

A sixth feature, combinable with any of the previous or following features, comprising: deactivating, by the application document store, the download link; and generating, by the application document store, the indication that the download link has been deactivated.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed. The computer storage medium is not, however, a propagated signal.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," "computing device," or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special-purpose logic circuitry, for example, a central processing unit (CPU), a field-programmable gate array (FPGA), or an application-specific integrated circuit (ASIC). In some implementations, the computer or computer-implemented system or special-purpose logic circuitry (or a combination of the computer or computer-implemented system and special-purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system, for example LINUX, UNIX, WINDOWS, MAC OS, ANDROID, or IOS, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special-purpose logic circuitry, for example, a CPU, an FPGA, or an ASIC.

Computers for the execution of a computer program can be based on general or special-purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device, for example, a universal serial bus (USB) flash drive, to name just a few.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/−R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special-purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity or a multi-touch screen using capacitive or electric sensing. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface (GUI) can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11x or other protocols, all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

The separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
   receiving, from a requestor and by an application agent associated with an application, a request for one or more attachment
   s stored in an application document store;
   for each attachment identified in the request, the application agent:

requests the attachment from a data privacy integration (DPI) kernel service, wherein the DPI kernel service comprises a DPI integrated personal data retrieval (iPDR) agent and a DPI iPDR attachment repository;

requesting, by the DPI iPDR agent and to the DPI iPDR attachment repository, metadata describing a download source of an attachment in the application document store;

receiving, by the DPI iPDR agent, the metadata;

receives, from the DPI kernel service, a download link to the attachment in the application document store, wherein the download link is received by the DPI kernel service directly from the application document store;

downloads, using the download link and directly from the application document store, the attachment;

informs the DPI kernel service that a download of the attachment is complete; and receives, from the DPI kernel service, a message that the download link has been deactivated, wherein the message that the download link has been deactivated is received directly from the application document store; and returning, by the application agent the one or more attachments to the requestor.

2. The computer-implemented method of claim 1, wherein the download link includes credentials, tokens, or certificates for authentication.

3. The computer-implemented method of claim 1, comprising:

determining, in the DPI iPDR attachment repository, the download source of the attachment in the application document store; and generating the metadata describing the download source of the attachment in the application document store.

4. The computer-implemented method of claim 1, comprising:

requesting, by the DPI iPDR agent and to the application document store, the download link; and receiving, by the DPI iPDR agent, and from the application document store the download link.

5. The computer-implemented method of claim 1, comprising:

requesting, by the DPI iPDR agent and to the application document store, deactivation of the download link; and receiving, by the DPI iPDR agent, and from the application document store, an indication that the download link has been deactivated.

6. The computer-implemented method of claim 5, comprising:

deactivating, by the application document store, the download link; and generating, by the application document store, the indication that the download link has been deactivated.

7. The computer-implemented method of claim 1, comprising:

requesting, from the application agent and to the application document store, a download of the attachment from the application document store using the download link.

8. A non-transitory, computer-readable medium storing one or more instructions executable by a computer system to perform operations comprising:

receiving, from a requestor and by an application agent associated with an application, a request for one or more attachments stored in an application document store;

for each attachment identified in the request, the application agent:

requests the attachment from a data privacy integration (DPI) kernel service, wherein the DPI kernel service comprises a DPI integrated personal data retrieval (iPDR) agent and a DPI iPDR attachment repository;

requesting, by the DPI iPDR agent and to the DPI iPDR attachment repository, metadata describing a download source of an attachment in the application document store;

receiving, by the DPI iPDR agent, the metadata;

receives, from the DPI kernel service, a download link to the attachment in the application document store, wherein the download link is received by the DPI kernel service directly from the application document store;

downloads, using the download link and directly from the application document store, the attachment;

informs the DPI kernel service that a download of the attachment is complete; and receives, from the DPI kernel service, a message that the download link has been deactivated, wherein the message that the download link has been deactivated is received directly from the application document store; and returning, by the application agent the one or more attachments to the requestor.

9. The non-transitory, computer-readable medium of claim 8, wherein the download link includes credentials, tokens, or certificates for authentication.

10. The non-transitory, computer-readable medium of claim 8, comprising:

determining, in the DPI iPDR attachment repository, the download source of the attachment in the application document store; and generating the metadata describing the download source of the attachment in the application document store.

11. The non-transitory, computer-readable medium of claim 8, comprising:

requesting, by the DPI iPDR agent and to the application document store, the download link; and receiving, by the DPI iPDR agent, and from the application document store the download link.

12. The non-transitory, computer-readable medium of claim 8, comprising:

requesting, by the DPI iPDR agent and to the application document store, deactivation of the download link; and receiving, by the DPI iPDR agent, and from the application document store, an indication that the download link has been deactivated.

13. The non-transitory, computer-readable medium of claim 12, comprising:

deactivating, by the application document store, the download link; and generating, by the application document store, the indication that the download link has been deactivated.

14. The non-transitory, computer-readable medium of claim 8, comprising:

requesting, from the application agent and to the application document store, a download of the attachment from the application document store using the download link.

15. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

receiving, from a requestor and by an application agent associated with an application, a request for one or more attachments stored in an application document store;

for each attachment identified in the request, the application agent:

requests the attachment from a data privacy integration (DPI) kernel service, wherein the DPI kernel service comprises a DPI integrated personal data retrieval (iPDR) agent and a DPI iPDR attachment repository;

requesting, by the DPI iPDR agent and to the DPI iPDR attachment repository, metadata describing a download source of an attachment in the application document store;

receiving, by the DPI iPDR agent, the metadata;

receives, from the DPI kernel service, a download link to the attachment in the application document store, wherein the download link is received by the DPI kernel service directly from the application document store;

downloads, using the download link and directly from the application document store, the attachment;

informs the DPI kernel service that a download of the attachment is complete; and receives, from the DPI kernel service, a message that the download link has been deactivated, wherein the message that the download link has been deactivated is received directly from the application document store; and returning, by the application agent the one or more attachments to the requestor.

16. The computer-implemented system of claim 15, wherein the download link includes credentials, tokens, or certificates for authentication.

17. The computer-implemented system of claim 15, comprising:

determining, in the DPI iPDR attachment repository, the download source of the attachment in the application document store; and generating the metadata describing the download source of the attachment in the application document store.

18. The computer-implemented system of claim 15, comprising:

requesting, by the DPI iPDR agent and to the application document store, the download link; and receiving, by the DPI iPDR agent, and from the application document store the download link.

19. The computer-implemented system of claim 15, comprising:

requesting, by the DPI iPDR agent and to the application document store, deactivation of the download link;

receiving, by the DPI iPDR agent, and from the application document store, an indication that the download link has been deactivated;

deactivating, by the application document store, the download link; and generating, by the application document store, the indication that the download link has been deactivated.

20. The computer-implemented system of claim 15, comprising:

requesting, from the application agent and to the application document store, a download of the attachment from the application document store using the download link.

* * * * *